(12) United States Patent
Eigler et al.

(10) Patent No.: US 6,419,116 B1
(45) Date of Patent: Jul. 16, 2002

(54) MOLDING NOZZLE GATE VALVE

(75) Inventors: Frank J. Eigler, Windsor (CA); Frederick G. Steil, Lake Orion, MI (US)

(73) Assignee: D-M-E Company, Madison Heights, MI (US)

( * ) Notice: Subject to any disclaimer, the term of this patent is extended or adjusted under 35 U.S.C. 154(b) by 0 days.

(21) Appl. No.: 09/794,672

(22) Filed: Feb. 27, 2001

(51) Int. Cl.$^7$ ................................................. G01F 11/00
(52) U.S. Cl. ........................... 222/1; 222/504; 425/549; 425/564
(58) Field of Search ............................... 222/146.5, 504; 425/549, 562, 564

(56) References Cited

U.S. PATENT DOCUMENTS

| | | |
|---|---|---|
| 4,306,852 A | 12/1981 | Mateev et al. |
| 4,925,384 A | 5/1990 | Manner |
| 5,334,008 A | 8/1994 | Gellert |
| 5,505,613 A | 4/1996 | Krummenacher |
| 5,518,393 A * | 5/1996 | Gessner ...................... 425/549 |
| 5,700,499 A | 12/1997 | Bauer |
| 5,811,140 A | 9/1998 | Manner |
| 5,830,524 A * | 11/1998 | Braun ......................... 425/549 |
| 5,849,343 A | 12/1998 | Gellert et al. |
| 5,924,607 A * | 7/1999 | Yamada et al. ............. 222/504 |
| 5,941,637 A * | 8/1999 | Maurer ........................ 425/564 |
| 6,086,356 A * | 7/2000 | Yu .............................. 425/564 |
| 6,164,954 A * | 12/2000 | Mortazavi et al. .......... 425/549 |
| 6,234,783 B1 * | 5/2001 | Shibata et al. .............. 425/549 |

* cited by examiner

*Primary Examiner*—Joseph A. Kaufman
(74) *Attorney, Agent, or Firm*—Stephen H. Friskney

(57) ABSTRACT

A molding nozzle controls the flow of material from a source of plastic melt to an outlet that communicates with a gate to a mold cavity. The nozzle contains a valve pin that includes a guide section and a valve end, and is movable toward and away from the gate to open and close the gate selectively. The valve pin is guided for movement by guide surfaces on inwardly-extending vanes within the nozzle, such that the guide surfaces engage the guide section of the valve pin. The valve end of the valve pin has a smaller diameter than that of the guide section, so that the valve section is free-floating to allow annular flow in the guide surface region to minimize the likelihood of formation of flow lines in the molded part.

15 Claims, 3 Drawing Sheets

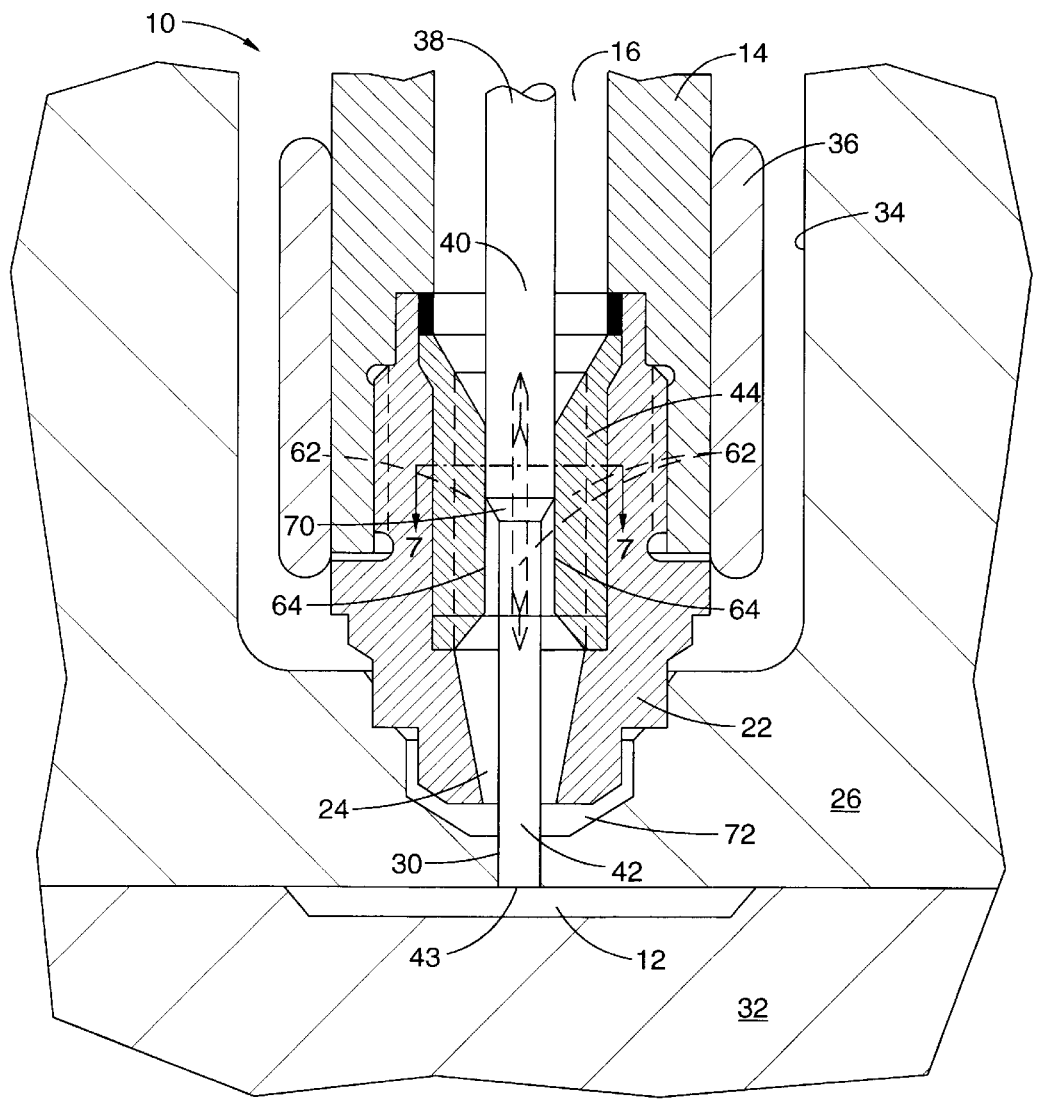
FIG. 6
FIG. 7
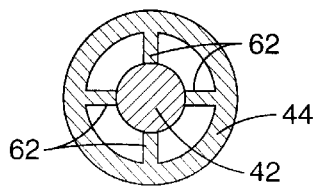
FIG. 8

MOLDING NOZZLE GATE VALVE

BACKGROUND OF THE INVENTION

1. Field of the Invention

The present invention relates to an injection molding nozzle that incorporates a valve member to control the flow of molding material into a mold cavity. More particularly, the present invention relates to an injection molding nozzle that includes a guide sleeve having inwardly-extending vanes for guiding an axially-movable valve pin so that the pin is properly aligned with a gate.

2. Description of the Related Art

Plastics injection molds often include a flow shut-off valve at the outlet end of a hot runner system to block the flow of molding material between successive injection phases of the machine cycle. A melt flow path originates in the interior of the plastication barrel of an injection molding machine and ends at a "gate" into the interior of the mold cavity. A pin-type valve member is often provided in an outlet nozzle adjacent the gate, to control the flow of molten plastic from the nozzle, then through the gate and into the mold cavity. In particular, a portion of the valve pin is movable into the gate to close it after the mold cavity has been filled, to block any further flow of molten material through the gate.

Various arrangements have been proposed to guide the valve pin within the nozzle to align the pin properly with the gate and to prevent the pin from causing damage either to the outer end of the valve pin itself or to the gate. In runnerless mold constructions where the gate provides direct communication between the mold cavity and the injection nozzle, the valve pin enters and closes the gate so that the end of the valve pin serves defines a portion of the mold cavity surface.

Previous valve pin guide arrangements often included support elements disposed in the material flow path, which serve to divide the incoming flow of molten plastic material into several independent streams that recombine at a point downstream, usually immediately adjacent the gate. As a result, the associated molded parts frequently exhibited objectionable flow lines representing areas where the independent flows of plastic had not sufficiently intermixed to join and form a homogeneous stream of melt before entering the mold cavity. For example, in U.S. Pat. No. 5,700,499, entitled "Valve Member Locating Insert For Injection Molding Nozzle", which issued on Dec. 23, 1997 to Klaus Bauer, there is disclosed a valve pin guide that includes an outer sleeve and a concentric inner sleeve, wherein the inner sleeve is supported by a radial connecting vane that extends from the outer sleeve to the inner sleeve. In that arrangement, the plastic flow is separated and must combine downstream of the insert.

Another known valve pin guide member that divides the melt flow stream is disclosed in U.S. Pat. No. 5,849,343, entitled "Injection Molding Apparatus With A One-Piece Gate Insert Locating A Cylindrical Valve Member", which issued on Dec. 15, 1998, to Jobst U. Gellert et al. The guide member disclosed in this patent includes a flow passageway that tapers from an inlet to a narrower outlet that defines the gate. Within the passageway are several axially-extending vanes that extend from the inlet of the insert to the outlet of the insert, which defines the gate, thereby preventing recombination of the several flow streams until the material enters the mold cavity leading to flow lines in the molded part.

Because flow lines in molded parts are objectionable in that they detract from the desired uniform surface appearance of the parts, it is desirable to provide a guide arrangement that avoids the formation of such flow lines while maintaining proper pin alignment. It is therefore an object of the present invention to overcome the shortcomings of the prior art devices and to provide an injection molding nozzle with a valve pin guide that allows the formation of parts that are substantially free of flow lines.

SUMMARY OF THE INVENTION

Briefly stated, in accordance with one aspect of the present invention, a nozzle is provided for controlling the flow of molding material from a melt source to an outlet that communicates with a gate that provides a point of entry to a mold cavity. The nozzle includes a nozzle body having a material inlet, a material outlet, and radially-inwardly-extending guide vanes that have guide surfaces. A valve pin is disposed within the nozzle body and is movable in an axial direction, such that with an end of the valve pin is engageable with the gate for selectively opening and closing the gate. More specifically, the valve pin is movable within the nozzle body between a retracted position at which the valve pin is spaced from the gate to allow flow of material through the nozzle, and an extended position, at which the valve pin closes the gate to block the flow of material. The valve pin includes a cylindrical guide section having an outer diameter that allows sliding engagement of the guide section with the guide surfaces of the guide vanes in the nozzle body. A cylindrical valve section of the valve pin is axially aligned with the guide section and includes a forwardmost end having a cross-section that corresponds with that of the gate, so that the valve section defines a closure valve for the gate.

In accordance with another aspect of the present invention, a method is provided for guiding a gate valve closure pin within a tubular nozzle body between an open position and a closed position to allow and block selectively the flow of material through a gate. The method includes moving the valve pin in an axial direction toward the gate from a retracted position to a first internal position without contact of the valve pin with the inwardly-extending guide surfaces associated with the nozzle body. The valve pin is subsequently brought into engagement with the guide surfaces in the nozzle for positive guiding of the valve pin as it continues to move axially toward the gate. In particular, the valve pin is guided by engagement of the valve pin periphery with the guide surfaces of the nozzle body. The gate is ultimately closed as the valve pin is guided to engagement of the forward end of the valve pin with the gate, thereby blocking the flow of material.

BRIEF DESCRIPTION OF THE DRAWINGS

FIG. 6 is a cross-sectional view similar to that of FIG. 4, showing the parts in their relative positions when the valve pin has fully extended so that its forwardmost end is received within the gate to close the gate.

FIG. 7 is a cross-sectional view taken along the line 7—7 of FIG. 6.

FIG. 8 is a perspective downstream end view of another embodiment of a guide sleeve in accordance with the present invention, in which the guide sleeve includes inclined guide vanes to impart swirl to the molten material.

DESCRIPTION OF THE PREFERRED EMBODIMENTS

Figure 1:
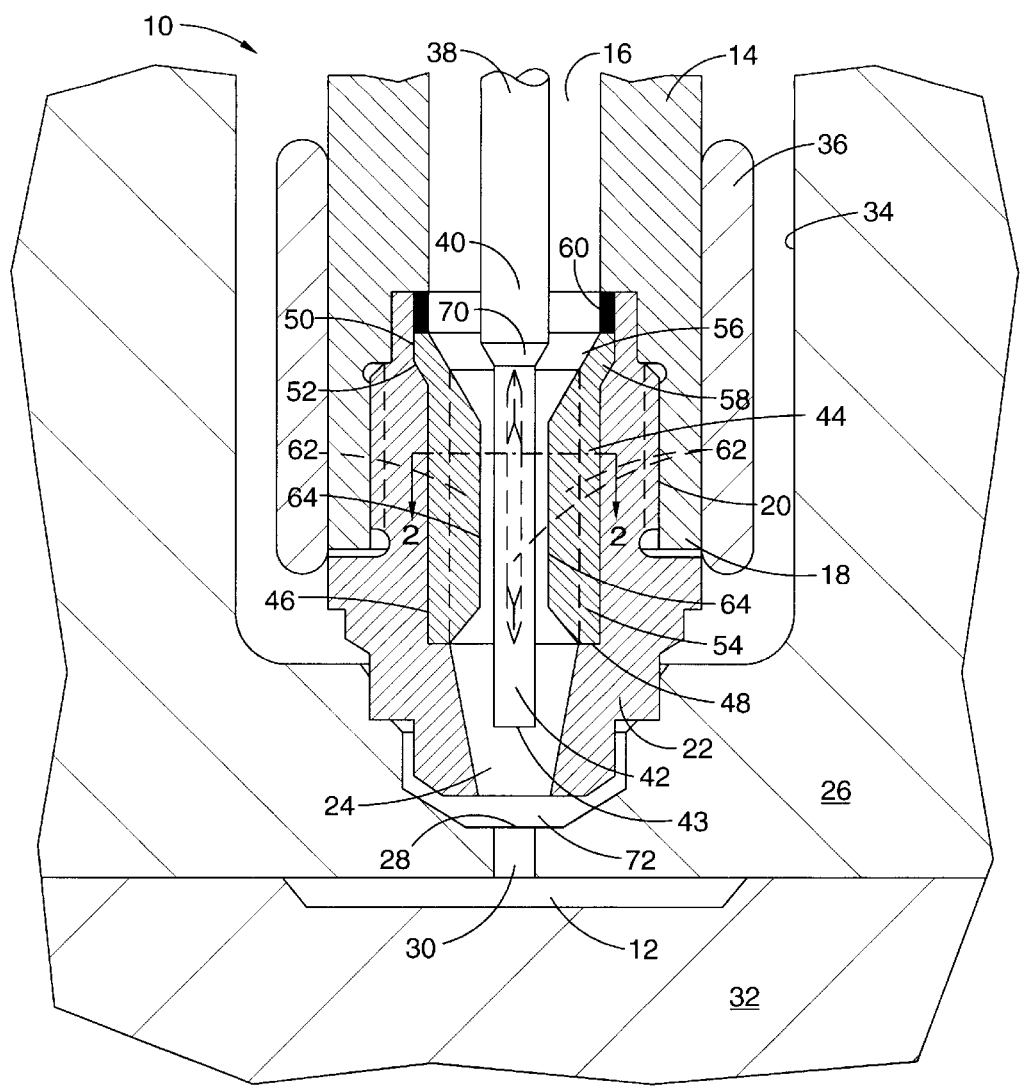
FIG. 1 is a fragmentary, longitudinal cross-sectional view of an embodiment of an injection molding hot runner gate valve in accordance with the present invention.

Referring now the drawings, and particularly to FIG. 1, there is shown a nozzle 10 through which molten plastic material flows into a mold cavity 12 from a source (not shown), such as a conventional injection molding machine plastication apparatus that includes an elongated, heated barrel within which a plastication screw is rotatably received for transforming solid plastic particles or pellets into a flowable plastic melt. The nozzle 10 includes a tubular nozzle body 14 that contains a melt channel 16 into which molten plastic material is introduced from the melt source. The downstream end 18 of the nozzle body 14 includes an axially-extending, internally-threaded bore 20 for receiving a tubular nozzle tip 22. An outlet opening 24 is provided in the nozzle tip 22 through which the molten material flows to enter and ultimately fill the mold cavity 12.

The nozzle tip 22 is in contacting engagement with a first mold half 26 that includes a circular opening 28 that defines the entrance to a cylindrical gate 30, which permits communication between the melt channel 16 of the nozzle 10 and mold cavity 12. The nozzle outlet opening 24 is axially aligned with the opening 28 and gate 30. A second mold half 32 is in abutting engagement with the first mold half 26 and the mold cavity 12 is defined between the mold halves 26, 32. The mold cavity 12 is so positioned in the second mold half 32 to allow communication with the gate 30 so that molten plastic can flow through the gate 30 and into the mold cavity 12 to fill the cavity and form a molded part upon cooling of the molten plastic within the mold cavity, as is known in the art.

As shown in FIG. 1, the first mold half 26 includes a recess 34 in which the nozzle 10 is received. Surrounding the nozzle body 14 is a heater 36 for supplying heat to the nozzle body 14 in order to maintain the plastic melt at a desired temperature as it enters the mold cavity 12. Although shown as a band heater, other types of heating elements can also be utilized, as will be appreciated by those skilled in the art.

The nozzle 10 includes a valve pin 38 that is disposed axially within the melt channel 16 and that is axially movable for controlling the flow of molten material into and through the gate 30. The valve pin 38 includes a cylindrical guide section 40 that has a diameter that is smaller than the outer diameter of the melt channel 16, to define an annular passageway to convey the flow of plastic melt along the valve pin 38 and into the nozzle tip 22. At its downstream end, the valve pin 38 includes a valve section 42 that is also cylindrical and that is coaxial with the guide section 40. The valve section 42 has an outer diameter that is smaller than the diameter of the guide section 40 and terminates in an forwardmost end 43. In that regard, the outer diameter of the valve section 42 generally corresponds with the diameter of the opening 28 and gate 30, so that when the valve pin 38 is extended fully forward, relative to the nozzle tip 22, the valve section 42 passes into the opening 28 to close the gate 30. When the valve pin 38 is its retracted position, i.e., the position of the parts as shown in FIG. 1, the gate 30 is open and molten plastic can flow from the melt channel 16 into the opening 28, through the gate 30 and into the mold cavity 12.

The valve pin 38 can be actuated for axial movement within the nozzle body 14 by a suitable actuation mechanism (not shown) to cause it to move toward and away from the opening 28. Known actuation mechanisms for such valve pins include a piston carried adjacent the upstream end of the valve pin 38 to ride within a cylinder for actuation either by hydraulic or pneumatic pressure. Other valve pin actuation arrangements can be of a mechanical nature, such as a rack gear connected to the valve pin 38 that engages with a rotatable pinion gear for moving the rack and the valve pin 38 in an axial direction.

Carried within the nozzle tip 22 is a guide sleeve 44 that also has a generally tubular form. The nozzle tip 22 includes a first inner counterbore 46 that defines a first inner step 48 with the nozzle outlet 24 and a second inner counterbore 50 that defines a second inner step 52 with the first counterbore 46. A second inner step 52 is spaced axially upstream from the first inner step 48 to define a stepped receptacle in which the guide sleeve 44 is carried. The guide sleeve 44 includes a downstream end 54 that is received in the inner counterbore 46 and abuts the first inner step 48. An enlarged upstream end 56 of the guide sleeve 44 is received in the outer counterbore 50 and includes an outer step 58 that abuts the second inner step 52. An annular sealing member 60 is provided in the outer counterbore 50 between the upstream end 56 of the guide sleeve 44 and the nozzle body 14 to provide a seal, so that the molten plastic flows from the melt channel 16 into the interior of the guide sleeve 44 and then through the nozzle outlet 24.

Figure 2:
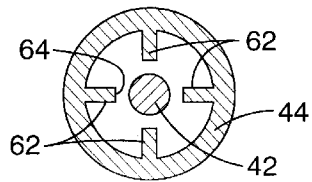
FIG. 2 is a cross-sectional view taken along the line 2—2 of FIG. 1.

The inner diameter of the guide sleeve 44 includes a plurality of radially inwardly extending guide vanes 62, each of which has an axially extending, innermost guide surface 64 that faces inwardly toward the central axis of the sleeve 44. As shown in FIGS. 1 and 2, four such guide vanes 62 can be provided, although as few as three guide vanes 62 would be sufficient for the guiding function that is hereinafter described. The guide surfaces 64 of each of the guide vanes 62 are defined by circular arcs, and the respective circular arcs of the guide surfaces 64 lie on an imaginary circle having a diameter just slightly larger than the diameter of the guide section 40 of the valve pin 38. When the valve pin 38 is retracted relative to the nozzle tip 22, as shown in FIGS. 1 and 2, the outer surface of the valve section 42 of the valve pin 38 is within the guide sleeve 44 but is spaced inwardly of the guide surfaces 64.

Figure 3:
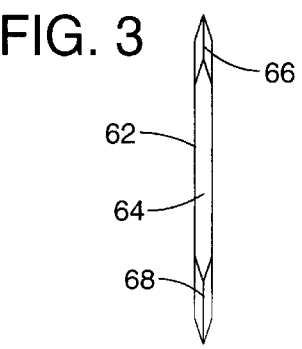
FIG. 3 is a front view of a guide surface carried by a guide vane that is provided in a guide sleeve in accordance with the present invention.

The guide vanes 62 as shown in FIGS. 1 and 2 extend in an axial direction relative to the longitudinal axis of the guide sleeve 44 and include inclined entry surfaces 66 to facilitate centering of the valve pin 38 as the guide section 40 is moved axially into the sleeve 44. The entry surfaces 66 can have a V-shaped cross-section to allow smooth flow of the molten plastic material as it flows through the guide sleeve 44. The downstream ends 68 of the guide vanes 62 can also be tapered with a V-shaped cross-section to allow smooth recombination of the portion of the material that flows between the guide vanes as the plastic melt flows along the guide vanes 62 and toward the nozzle outlet 24. FIG. 3 shows the guide surface 64, entry surface 66 and downstream end 68 of a guide vane 62.

To allow smooth centering of the guide section 40 of the valve pin 38 as it enters the guide sleeve 44, the valve pin 38 includes a frustoconical transition section 70 between the guide section 40 and valve section 42. The angle of inclination of the transition section 70, relative to the valve pin longitudinal axis, can advantageously be approximately the same as the angle of inclination of the entry surfaces 66. Additionally, although the valve pin 38 is connected at its upstream end to an actuator (not shown) for moving the valve pin 38 axially within the nozzle body 14, the downstream end of the valve pin 38 is unsupported in the retracted position, as shown in FIG. 1.

In operation, molten plastic material is introduced into the melt channel 16 within the nozzle 10 and flows in a downstream direction toward the nozzle tip 22 and nozzle outlet 24. In that regard, the melt channel 16 is an annular channel that is defined between the inner surface of the tubular nozzle body 14 and the outer surface of the cylindrical valve pin 38. The flow of plastic melt enters the guide sleeve 44 and passes over and around the guide vanes 62 and around the valve section 42 of the valve pin 38. As will be apparent, the central, inner portion of the melt flow stream will remain in an annular form, as it flows between the guide surfaces 64 of the guide vanes 62 and the outer surface of the valve section 42 of the valve pin 38. The remaining, outermost portion of the flow stream, the portion adjacent the interior surface of the nozzle body 14, will flow into the spaces between adjacent guide vanes 62 while remaining connected with the central, inner portion of the annular flow stream. Thus, in the structure herein disclosed the melt stream is not divided into several independent, disconnected flow streams that must later be recombined, but is a unitary, continuous flow stream.

The molten material flows along the valve section 42 of pin 39, past the forwardmost end 43 and into a gap 72 between the outer end of the nozzle tip 22 and recess 34 in the first mold half 26, adjacent the opening 28. The material proceeds through the opening 28, into the gate 30 and then into the mold cavity 12. When the mold cavity 12 has been filled, the valve pin 38 is shifted in an axial direction toward the mold cavity 12, to cause the forwardmost end 43 of the valve section 42 to enter the opening 28 and thereby close the gate 30 to block further flow of molten material into the mold cavity. Movement of the valve pin 38 is terminated when the surface at the forwardmost end 43 is flush with the associated mold cavity surface. The material within the mold cavity 12 is then allowed to cool, which can be accelerated by providing cooling channels (not shown) within the mold halves 26, 32 adjacent the mold cavity 12. When the molded part has cooled sufficiently, the mold is opened by separating the mold halves 26, 32 and the part is removed from the mold cavity 12. The mold halves 26, 32 can again be moved into contacting relationship and the molding cycle can be repeated.

FIGS. 1 and 2 show the invention with the valve pin 38 is in its retracted position, so that plastic melt can flow freely through the nozzle body 14, nozzle tip 22, nozzle outlet 24, and into the opening 28. As the valve pin 38 is moved from its retracted position toward its extended position, the valve pin 38 is substantially centered within the nozzle body 14 by the flowing molten plastic material.

Figure 4:
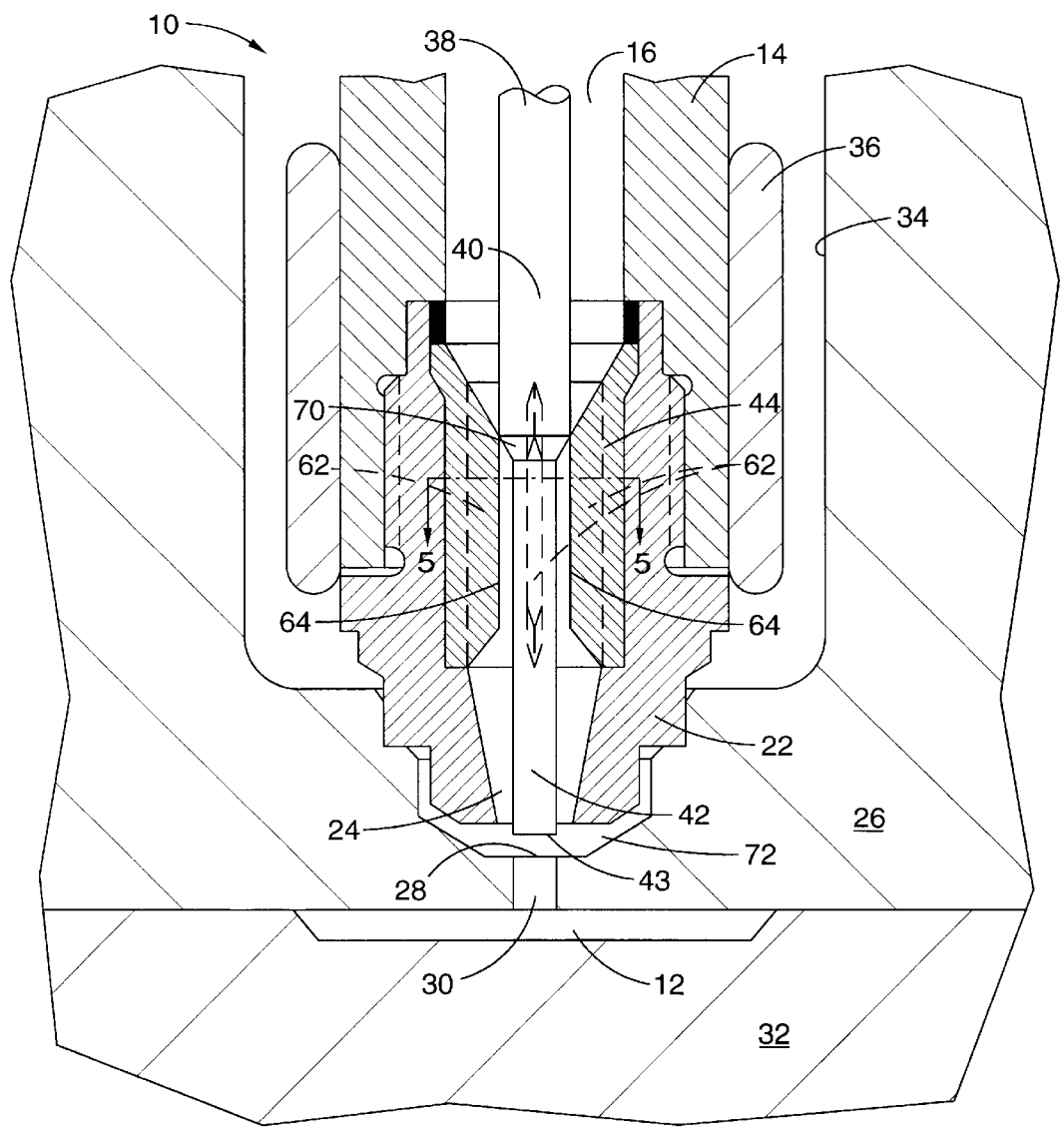
FIG. 4 is a cross-sectional view similar to that of FIG. 1 and showing the position of the valve pin relative to the gate as the valve pin guide section comes into engagement with the guide surfaces of the guide sleeve.
Figure 5:
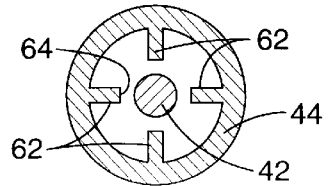
FIG. 5 is a cross-sectional view taken along the line 5—5 of FIG. 4.

As the valve pin 38 moves toward the mold cavity 12 during its extension stroke, transition section 70 enters the guide sleeve 44, as shown in FIGS. 4 and 5. If the valve pin 38 is somewhat off center, the contact of the transition section 70 with the entry surfaces 66 of guide vanes 62 will cause the valve pin 38 to become centered within the sleeve 44. Additional axial movement of the valve pin 38 toward the opening 28 will cause the guide section 40 of the valve pin to be received between and to come into contact with the innermost guide surfaces 64 of the respective guide vanes 62, which serve to guide the valve pin 38 in an axial direction relative to the nozzle tip 22 so that the forwardmost end 43 is axially aligned with the opening 28.

Upon further extension of the valve pin 38 toward the opening 28, the forwardmost end 43 of the valve section 42 enters the opening 28. Movement of the valve pin 38 continues until it completely fills the gate 30 and the end surface of the forwardmost end 43 is flush with the adjacent surface of the mold cavity 12, which is the position shown in FIGS. 6 and 7. As is apparent from FIG. 7, there is continuous, uninterrupted communication between the molten material that is within the gap 72 and the molten material within the upstream portion of the melt channel 16. Consequently, when the valve section 42 closes the opening 28 and enters the gate 30, any molten material displaced by the downward movement of the guide section 40 of the valve pin 38 can flow in an upstream direction, toward the molten material source, and it will not be unduly compressed to cause possible leakage between the respective parts that define the melt flow channel 16.

Although illustrated and described on the basis that the guide vanes 62 extend in an axial direction parallel to the nozzle longitudinal axis, the orientation of the guide vanes can be changed, if desired. As an alternative construction, the guide vanes can be so oriented within the guide sleeve that they are inclined relative to the guide sleeve axis, as shown in FIG. 8. In that regard, the guide sleeve 74 has a tubular form similar to that of the guide sleeve 44 shown in FIGS. 1 and 2. However, each of the guide vanes 76 is similarly configured and similarly oriented so that it is inclined relative to the axis of the sleeve 74. As a result, the guide vanes 76 will to impart a swirling effect to the flow stream of plastic melt, which serves to aid in mixing of the material as it passes the vanes 76 and thereby further minimizes the likelihood of the formation of flow lines in a molded part. The angle of inclination of the guide vanes 76 relative to the axis of the guide sleeve 74 can be of the order of from about 100 to about 60°.

It will be apparent to those skilled in the art that the nozzle and nozzle valve structures illustrated and described herein provide distinct advantages over the structures previously employed. Structures in accordance with the present invention as herein described will be seen to minimize the formation of flow lines in a molded part because the unitary body of flowing material as it passes through the nozzle, and also because the inner guide vanes within the guide sleeve terminate at a point well upstream of the nozzle outlet, thereby allowing sufficient distance for the flow stream to return to its purely annular form as it enters the nozzle outlet passageway. Furthermore, when the valve is in its fully open condition, as shown in FIG. 1, the forwardmost end of the valve pin is spaced from the gate a distance sufficient to allow the flow stream to transition from an annular form to a cylindrical form having a circular cross-section before entering the gate, again, to minimize the possibility of flow lines in the molded part.

Although particular embodiment of the present invention has been illustrated and described, it will be apparent to those skilled in the art that various changes and modifications can be made without departing from the concepts of the present invention. Accordingly, it is intended to encompass within the appended claims all such claims and modifications that fall within the scope of the present invention.

What is claimed is:

1. A nozzle for controlling the flow of molding material from a source chamber to an outlet that communicates with a gate to a mold cavity, comprising:

a nozzle body including a material inlet and a material outlet, the nozzle body including at least two radially inwardly directed guide vanes that have innermost guide surfaces that lie on an imaginary circle having a first diameter;

a valve pin disposed within the nozzle body to be axially movable and having an end that is sized to be receivable within and block flow through the gate, such that the valve pin is movable within the nozzle body between a retracted position at which the valve pin is spaced from the gate to allow flow of material through the gate, and an extended position at which the end of the valve pin is within the gate to block flow through the gate, the valve pin including a cylindrical guide section having an outer diameter that is slightly smaller than the first diameter to allow sliding movement of the guide section along the guide surfaces, and a cylindrical valve section that is axially aligned with and connected to the guide section, the valve section having a diameter that is smaller than the first diameter and including a forwardmost end that has a cross-section that corresponds with that of the gate and thereby defines a closure valve for the gate.

2. A nozzle in accordance with claim 1 including a tubular guide sleeve carried within the nozzle body, wherein the guide vanes are carried by the guide sleeve.

3. A nozzle in accordance with claim 1 wherein downstream ends of the guide surfaces terminate at an axial position spaced from the gate.

4. A nozzle in accordance with claim 1 wherein upstream ends of the guide surfaces terminate at an axial position such that when the valve pin is in its retracted position, the guide section of the valve pin is spaced axially away from the upstream ends the guide surfaces and the valve section of the valve pin is in an unguided condition to allow annular flow of material through the nozzle, with the end of the valve pin in free-floating condition relative to the guide surfaces.

5. A nozzle in accordance with claim 1 wherein upstream ends of the guide surfaces terminate at a valve pin engagement position so that the end of the valve pin is disengaged from the gate when the guide section of the valve pin first contacts the upstream ends of the guide surfaces during a closing stroke of the valve pin, and wherein the guide surfaces extend in an axial direction a distance sufficient to maintain engagement between the guide surfaces and the guide section as the valve pin moves from the guide surface engagement point to a position at which the valve section engages the gate to block flow of material through the gate.

6. A nozzle in accordance with claim 2 wherein the cross-sectional flow area within the nozzle body and along the axial extend of the guide surfaces is a uniform flow area.

7. A nozzle in accordance with claim 2 wherein the guide sleeve includes a plurality of radially inwardly extending guide vanes that are uniformly circumferentially spaced from each other and that extend axially relative to the nozzle body.

8. A nozzle in accordance with claim 2 wherein the guide vanes are uniformly circumferentially spaced from each other and extend in a helical direction relative to the nozzle longitudinal axis, to impart a swirl component of motion to material flowing through the sleeve.

9. A nozzle in accordance with claim 8 wherein the guide vanes extend at an angle from about 10° to about 60° relative to the nozzle body longitudinal axis.

10. A nozzle in accordance with claim 1 wherein the guide surfaces are defined by circular arcs having their centers coincident with the longitudinal axis of the nozzle body.

11. A nozzle in accordance with claim 2 wherein the guide surfaces are defined by circular arcs having their centers coincident with the longitudinal axis of the guide sleeve.

12. A nozzle in accordance with claim 1 wherein the guide surfaces include axially tapered leading edges.

13. A nozzle in accordance with claim 1 wherein the guide surfaces include axially tapered trailing edges.

14. A nozzle in accordance with claim 12 wherein the guide surfaces include axially tapered trailing edges.

15. A method of guiding a gate valve closure pin within a tubular nozzle body between an open position and a closed position to allow and block selectively the flow of material through a gate, comprising the steps of:

providing a stepped, cylindrical valve pin having a guide section and a valve end, the valve end having a smaller diameter than that of the guide section;

allowing the valve end of the valve pin to be in a free-floating condition relative to and within the nozzle body when the valve pin is in a retracted position relative to the gate to permit material to pass through the gate;

moving the valve pin in an axial direction from the retracted position toward the gate for a first distance to a first axial position without contact of the valve pin with inwardly-extending guide surfaces carried by the nozzle body;

engaging the guide section of the valve pin with the guide surfaces carried by the nozzle body for positive guiding of the valve pin as it continues to move axially toward the gate;

guiding the valve pin by engagement of the guide section of the valve pin with the guide surfaces carried by the nozzle body as the valve end of the valve pin approaches the gate; and closing the gate as the guide section of the valve pin is guided by the guide surfaces by inserting the valve end of the valve pin into the gate to block the flow of material.

* * * * *